April 26, 1960     H. H. KENNEDY     2,934,369
FISH-LINE TYING DEVICE
Filed May 1, 1958
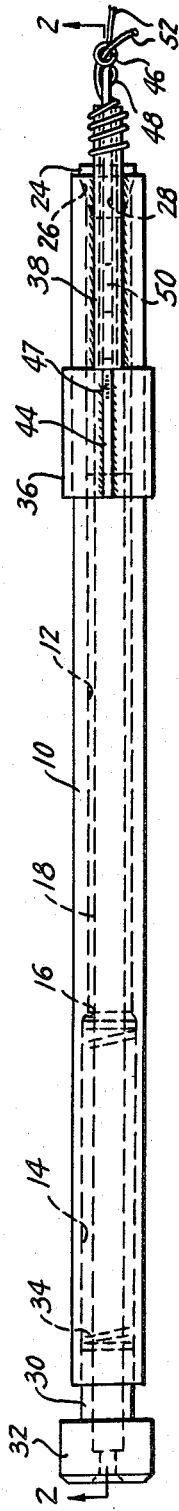
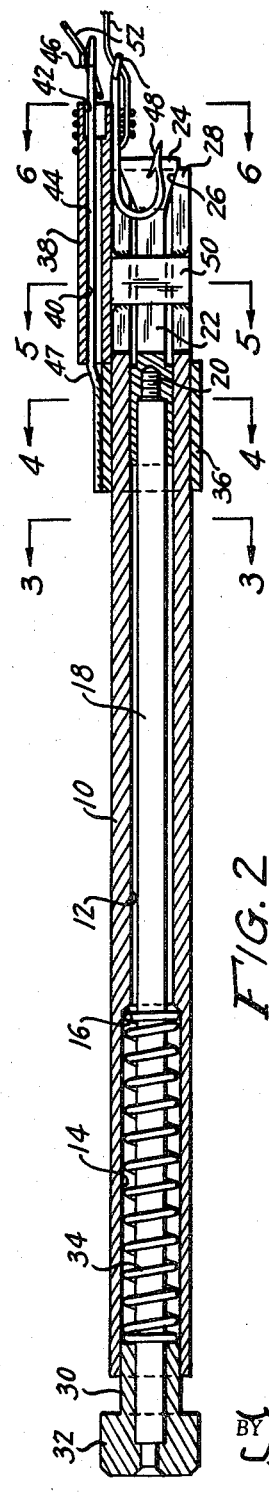
INVENTOR
HUGH H. KENNEDY
BY Gustave Miller
ATTORNEY

United States Patent Office 2,934,369
Patented Apr. 26, 1960

2,934,369

FISH-LINE TYING DEVICE

Hugh H. Kennedy, Los Angeles, Calif., assignor of thirty percent to Steve J. Figaszewski, Inglewood, Calif.

Application May 1, 1958, Serial No. 732,317

6 Claims. (Cl. 289—17)

This invention relates to a device for tying a fish line to a fish hook, and is particularly concerned with the tying of a uniform, non-slip knot.

It is one object of the present invention to provide a tying device which performs the tying operation with a minimum of manual effort.

Another object of the present invention is to provide a tying device which is a complete unit wherein the parts are not loose and cannot be misplaced or lost easily.

Another object of the present invention is to provide a tying device that is small and compact enough to be easily carried in any pocket of a fisherman's clothing.

Another object of the present invention is to provide a tying device wherein the fish line need not be threaded through any hole, loop or eye except that of the fish hook itself, whereby the device may be used even by one having impaired vision or, as if often the case, by a fisherman whose hands are numb with cold so that the nimbleness of his fingers is affected.

Another object of the present invention is to provide a tying device which will duplicate a perfect knot every time.

Another object of the present invention is to provide a tying device which can tie a knot which will not slip or cut the fish line.

Other objects of the present invention are to provide an improved tying device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

Fig. 1 is a top plan view of a device embodying the present invention.

Fig. 2 is a sectional view taken on line 2—2 of Fig. 1.

Fig. 3 is a cross-sectional view taken on line 3—3 of Fig. 2.

Fig. 4 is a cross-sectional view taken on line 4—4 of Fig. 2.

Fig. 5 is a cross-sectional view taken on line 5—5 of Fig. 2.

Fig. 6 is a cross-sectional view taken on line 6—6 of Fig. 2.

Referring now in greater detail to the drawing wherein similar reference characters refer to similar parts, there is shown a tubular body 10 having a bore 12 and a counterbore 14, the bore being separated from the counterbore by a shoulder 16.

Within the bore 12 and counterbore 14 is a longitudinally movable rod 18 having an externally-threaded nipple 20 engageable within the internally threaded bore of the shaft 22 of a collet 24 consisting of a pair of spring jaws which are biased to open position but are moved into closed position by movement of the rod 18 to the left as viewed in Fig. 2. This collet 24 is provided with an outer bevelled surface which coacts with a correspondingly bevelled surface 26 at the end of the tubular body 10. This end of the tubular body 10 is also split, as at 28 to mate with the split between the two jaws of the collet 24.

The opposite end of the rod 18 is provided with a sleeve 30 which has a slidable fit within the counterbore 14 and which is provided with an integral hand grip portion 32 externally of the counterbore 14. A coil spring 34 surrounds the rod 18 within the counterbore 14 and abuts at one end against the shoulder 16 and at the other end against the internal end of the sleeve 30, whereby the spring 34 acts to resiliently bias the rod 18 to the left, as viewed in Fig. 2.

At the front end of the tubular body 10, this being the end at which the collet 24 is positioned, there is slidably mounted an external collar 36 to which is connected a spring steel rod 44 extending through a relatively narrow tube 38. This tube 38 overlies and is secured to the front end of tubular body 10 and extends beyond this end. This tube 38 is provided with a longitudinal bore 40 and a front counterbore 42. Extending through the bore 40 and counterbore 42 of tube 38 is the spring steel rod or wire 44 having a front hook portion 46 outside the front end of tube 38. This wire 44 is also provided with an offset shoulder 47 outside the other end of tube 38. The rod or wire 44 is slidable through tube 38 but retained against falling out by hook portion 46 and collar 36, hook portion 46 fitting within counterbore 42 but not bore 40.

The collet 24 is adapted to clampingly engage a fish hook 48 between its jaws, these jaws being open when rod 18 is pushed to the right, as viewed in Fig. 2, and being closed when moved to the left, as by spring 34. During the longitudinal movement of rod 18, collet 24 and its shaft 22, the assembly is held against rotation by a key 50 positioned in a split in the shaft 22 which mates with the split 28 in the body 10.

In operation, with the fish hook 48 clamped in the collet 24, the fish line 52 is inserted through the eye of the fish hook and is then wrapped around the shank of the fish hook and around tube 38. The end of the fish line 52 is then wrapped around the spring rod 44. As the rod 44 is pulled back through tube 38, its hooked end 46 engages the line 52 and pulls it through the wrapped portion of the line around the fish hook shank and tube 38. The collet 24 is then released and the fish line is slipped off the tube 38 leaving it wrapped around the shank of hook 48. The fish line is then pulled tight and the non-slip knot is thereby completed.

Although any desired material may be used in the construction of this device, it is preferable to make it entirely of brass except for the spring portions which are preferably made of spring steel. The use of brass increases the life and usefulness of the device which is constantly subject to water immersion.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A fish-line tying device comprising an elongated, tubular body having a front end and a rear end, a rod longitudinally movable within and biased toward said rear of said body, a collet at the front end of said rod, pushing means on said rod at its rear end, a relatively narrow tube fixed to the front end of said body, a spring rod longitudinally slidable in said tube, and a hook portion on said spring rod extendable from within to forwardly of said narrow tube.

2. The device of claim 1, said tubular body being counterbored and having a counterbore shoulder facing the rear end of said tubular body, and means within said tubular body biased against said counterbore shoulder resiliently biasing said rod toward the rear end of said body.

3. The device of claim 1 and means fixed in said tubular body and cooperating with said collet to hold said collet against rotation during longitudinal movement thereof.

4. A fish-line tying device comprising an elongated, tubular body, a bore in said body and a counterbore at one end, a rod longitudinally movably positioned in said bore and said counterbore, a collet at one end of said rod and a spring at the opposite end, said spring being positioned within the counterbore and connected to said rod to resiliently urge said rod in one direction, a handle on said rod to move it in the opposite direction, a narrow tube on said body adjacent said collet, a spring rod slidable in said tube, a hook portion on said spring rod, and a counterbore in said tube to receive said hook portion.

5. The device of claim 4 wherein said collet is connected to said rod through a collet shaft, said collet shaft being split to mate with a corresponding split in the adjacent portion of the body, and a key positioned within said mating splits to prevent rotation of said collet relative to said body.

6. The device of claim 4 wherein one end of said tube extends beyond the corresponding end of said body and beyond said collet when said collet is in closed position.

References Cited in the file of this patent

UNITED STATES PATENTS

| | | |
|---|---|---|
| 2,601,605 | Fulvio | June 24, 1952 |
| 2,734,299 | Masson | Feb. 14, 1956 |

FOREIGN PATENTS

| | | |
|---|---|---|
| 836,815 | France | Oct. 24, 1938 |